(12) United States Patent
Balasubramanian (10) Patent No.: US 9,536,075 B2
(45) Date of Patent: Jan. 3, 2017

(54) DYNAMIC RESOURCE SHARING

(71) Applicant: Infineon Technologies AG, Neubiberg (DE)

(72) Inventor: Prakash Kalanjeri Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 210 days.

(21) Appl. No.: 13/783,100

(22) Filed: Mar. 1, 2013

(65) Prior Publication Data

US 2014/0250540 A1   Sep. 4, 2014

(51) Int. Cl.
*G06F 21/74* (2013.01)
*G06F 21/44* (2013.01)

(52) U.S. Cl.
CPC .............. *G06F 21/44* (2013.01); *G06F 21/74* (2013.01)

(58) Field of Classification Search
None
See application file for complete search history.

(56) References Cited

U.S. PATENT DOCUMENTS

| 2004/0143714 A1* | 7/2004 | Watt ................... G06F 12/1491 711/163 |
| 2007/0226795 A1* | 9/2007 | Conti et al. ..................... 726/22 |
| 2011/0046837 A1 | 2/2011 | Khosla et al. |

FOREIGN PATENT DOCUMENTS

| CN | 102103518 A | 6/2011 |
| CN | 102404385 A | 4/2012 |

* cited by examiner

*Primary Examiner* — Brandon Hoffman
(74) *Attorney, Agent, or Firm* — Eschweiler & Associates, LLC (57) ABSTRACT

Representative implementations of devices and techniques provide dynamic secure sharing of resources. A resource module can be partitioned into a plurality of functional blocks, which may be allocated to non-secure and secure applications. A security monitor can monitor processor activity and determine when secure resources may be accessed.

23 Claims, 10 Drawing Sheets

DYNAMIC RESOURCE SHARING

BACKGROUND

Intellectual property (IP) piracy and other forms of potentially injurious activities are a major concern in many operating or computing environments. Often, microcontrollers, for example, do not offer trusted execution environments for executing proprietary or confidential routines, due to the configuration of the hardware. For instance, the architecture of the hardware may be based more on economical design considerations, particularly when the hardware is to be deployed in an industrial application. This can be problematic, when considering the potentially exposed environments that such microcontrollers may be operating within. Valuable IP assets such as firmware, software, data, and the like may be vulnerable to attack in these situations.

Proposed solutions often include duplication of resources, which may include additional hardware components or systems. For example, a system-on-chip (SoC) may include additional "secure" components (for digital rights management purposes, for example) in addition to like general purpose components on the chip. Secure components may only be used by trusted applications in a secure environment, for example. Such secure components may include clocks, interrupt controllers, keypad controllers, DMA modules, memory, and the like. In general, resource duplication entails additional die size and increased power consumption.

In other proposed solutions, designed time-partitioning may be used to switch modules from a non-secure mode to a secure mode and back, as needed to run secure applications. However, once a module is temporarily assigned to a non-secure application or to a secure application, the whole module is generally unavailable to the other "world" (e.g., secure applications/routines or non-secure applications/routines, respectively) for a time, until it is relinquished by the assigned application. This is generally true, even if the module includes several functional blocks, capable of being used concurrently and independently. In such a situation, many of the functional blocks of the module may be idle (a majority, for example), while the remainder of the blocks of the module (a few, for example) are being used by the assigned application. This technique can limit the range of applications and/or use cases for the design and can be inefficient.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Representative implementations of devices and techniques provide dynamic secure sharing of resources by non-secure and secure applications without the need for duplicated hardware, and the accompanying increased die size and power consumption. In an example, a resource module can be partitioned into a plurality of functional blocks, which may be allocated to non-secure and secure applications. In an implementation, some functional blocks from a resource module may be allocated to non-secure applications and other functional blocks from the resource module may be allocated to secure applications concurrently, without data leakage or compromising the security of the secure application(s).

In an implementation, a security monitor can monitor processor activity and determine when secure resources may be accessed, based on requests for secure resources by applications executing on the processor. For example, the security monitor can output a secure-mode signal when a secure application requests access to a resource module. The security monitor can then de-assert the secure-mode signal when access to secure resources is finished.

In various implementations, the resource modules are associated with a security socket arranged to determine access permissions of each of the allocated functional blocks of the resource modules. For example, the access permissions may be based on whether a functional block is allocated to a non-secure application or allocated to a secure application.

Various implementations and techniques for secure resource sharing are discussed in this disclosure. Techniques and devices are discussed with reference to example microcontroller devices and systems illustrated in the figures. However, this is not intended to be limiting, and is for ease of discussion and illustrative convenience. The techniques and devices discussed may be applied to many of various processor and controller device designs, embedded devices and systems, structures, and the like, and remain within the scope of the disclosure. Use of the term microcontroller or controller in this disclosure is intended to include any and all such processor devices, system, structures, and so forth.

Implementations are explained in more detail below using a plurality of examples. Although various implementations and examples are discussed here and below, further implementations and examples may be possible by combining the features and elements of individual implementations and examples.

Example Controller Topology

Figure 1:
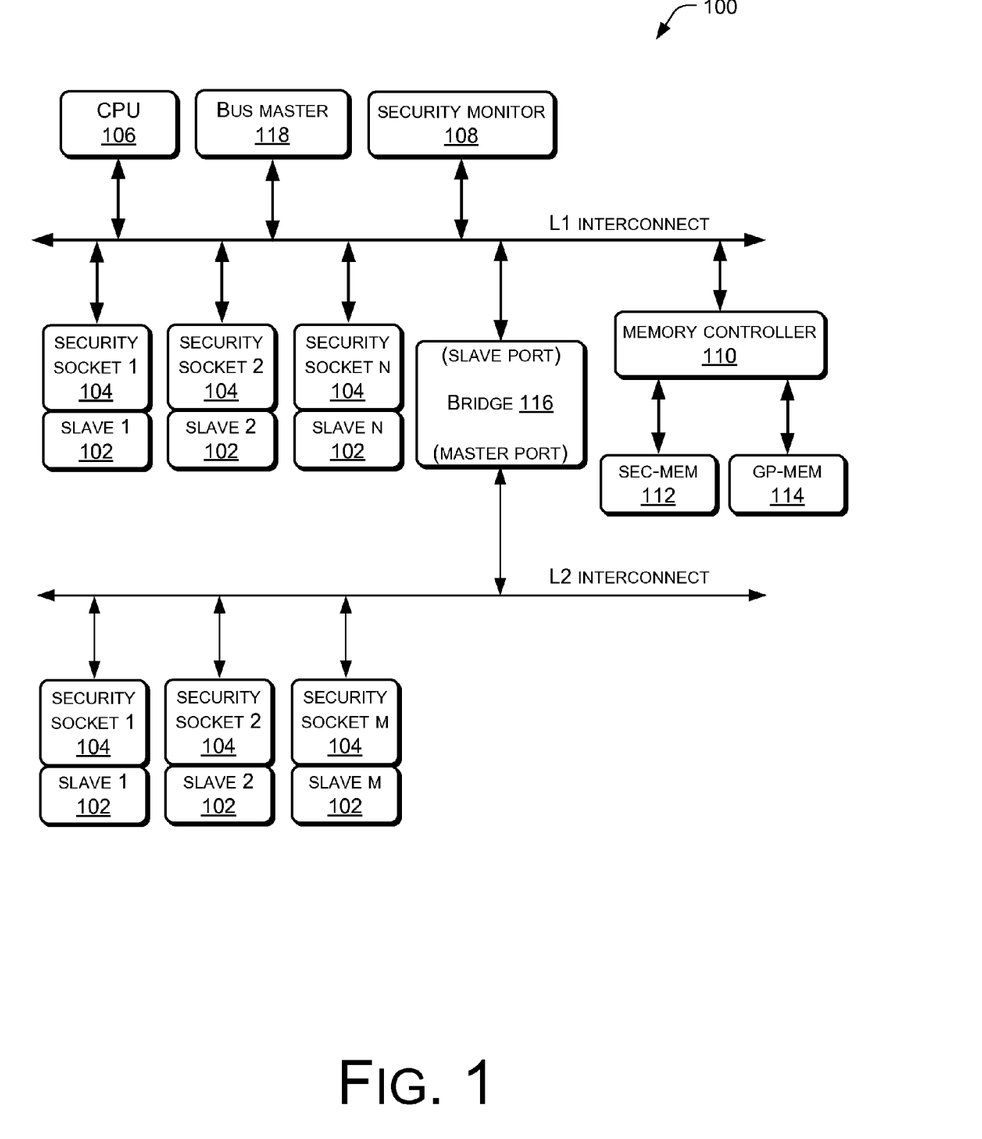
FIG. 1 is a block diagram of a portion of an example microcontroller topology, wherein the techniques and devices disclosed herein may be applied, according to an implementation.

FIG. 1 is a block diagram of a portion of an example controller (e.g., microcontroller, etc.) topology 100, wherein the techniques and devices disclosed herein may be applied, according to an implementation. The example topology 100 is shown with at least two interconnect buses (L1 and L2), with a quantity "n" resource (e.g., slave) modules 102 ("modules") on the L1 interconnect and another quantity "m" modules 102 on the L2 interconnect. In various implementations, a topology 100 may have any quantity of buses, interconnects, and modules 102, as well as additional components.

For example, in the example topology 100 of FIG. 1, each module 102 is associated with a security socket 104 arranged to determine access permissions for the module 102, as described further below. Additionally, the illustration of FIG. 1 includes a central processing unit (CPU) 106, a security monitor 108, a memory controller 110, secure memory 112, general purpose memory 114, a bridge component 116, and a bus master component 118. In various implementations, the topology 100 may include fewer, additional, or alternate components, and remain within the scope of the disclosure.

In an implementation, the resource modules ("modules") 102 represent resources that may be used by applications executing on the CPU 106 to perform operations or tasks. For example, the modules 102 may include reference components like a real-time clock; task managing components such as an interrupt controller; input-output managing components such as a keypad controller; memory managing components such as a direct memory access (DMA) module, and so forth. It is to be understood that these examples are merely a few examples of the many possible types of modules 102. In general, any and all resources that may be requested and/or employed by an application executing on the CPU 106 may be a module 102.

In various implementations, the CPU 106 is arranged to execute one or more non-secure applications and one or more secure applications concurrently. The CPU 106 may include single-processor or multiprocessor computer, processor, or controller systems, mini-computing devices, mainframe devices, as well as personal computers, handheld or mobile computing devices (e.g., tablets, smartphones, etc.), microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computing devices. In a distributed computing environment, program components may be located in both local and remote memory storage devices (such as memory devices 112, 114).

In an implementation, the security monitor 108 is arranged to monitor the processor (i.e., CPU 106) for secure mode entry and exit sequences by applications executing on the processor 106. For example, the security monitor 108 is arranged to assert the secure-mode signal when an authorized application begins a secure transaction or initiates access to a secure resource. Further, the security monitor 108 de-asserts the secure-mode signal when an application ends a secure transaction or terminates access to a secure resource.

Figure 4A:
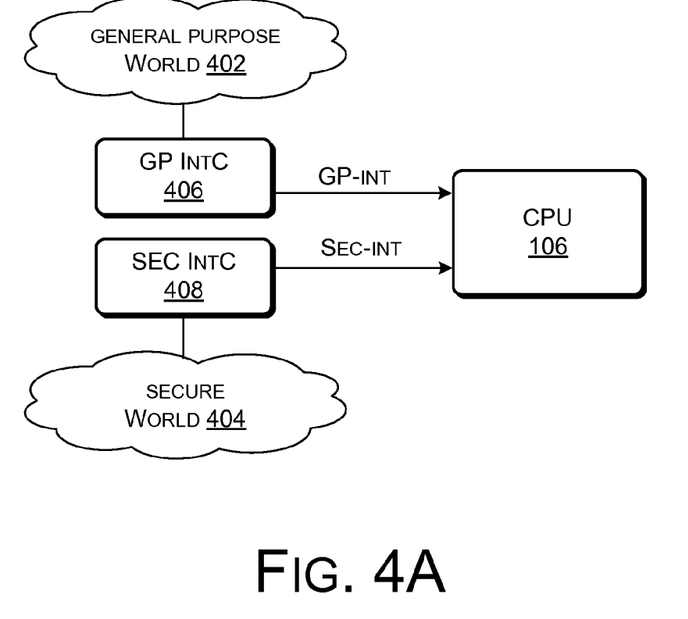
FIG. 4A is a block diagram of an example interrupt handling scheme that includes dedicated interrupt handling.
Figure 4B:
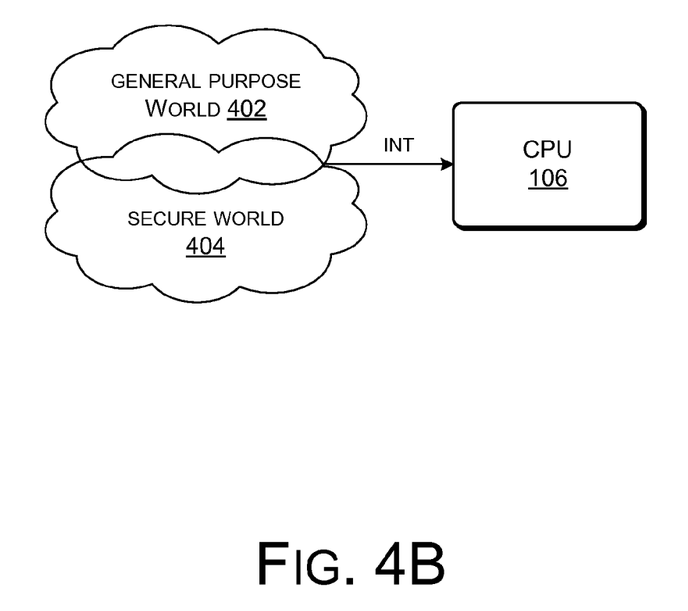
FIG. 4B is a block diagram of an example interrupt handling scheme that uses a common interrupt for secure and general purpose uses, according to an implementation.

In one implementation, as shown in FIG. 4, the security monitor 108 includes a snooper component 402 arranged to monitor the processor 106 and to determine whether an application executing on the processor 106 requests secure access to a resource, such as a module 102, a memory 114, or the like.

In various implementations, the security monitor 108 outputs a secure-mode signal when conditions for entering secure-mode are fulfilled. For example, when a non-secure application requests for a functional block 202 of a resource module 102 to be assigned to the non-secure application, through a pre-defined contract (via bootROM, for example), or the like, the bootROM code (or a like mechanism) may execute a sequence to convince the security monitor 108 that the request is bona fide. In such an example, the security monitor 108 outputs the secure-mode signal, asserting secure mode. In the implementations, the security monitor 108 may include an output component (not shown), for example, arranged to output the secure-mode signal granting secure access to secure functional blocks of shared resource modules when the requesting application is a secure application, or the requesting application has authorization to access secure resources.

In an additional implementation, the security monitor 108 is arranged to handle or manage secure interrupt requests. In this way, the interrupts are handled in a secure manner, and isolated from non-secure systems or applications. For example, the security monitor 108 can aggregate secure interrupt requests and forward the aggregated secure interrupt requests to the processor 106 and/or an interrupt controller for processing of the interrupts.

In one example implementation, the security monitor 108 includes an interrupt handling component (not shown) arranged to reprogram an interrupt vector register with a secure interrupt service routine (ISR) handler when the secure-mode signal is asserted. For example, the security monitor 108 may be arranged to program a dedicated secure mode interrupt vector entry with the address of the secure mode ISR (defined in secure ROM, for example) and forward the interrupt to the CPU 106 and/or an interrupt controller for processing of the interrupts. In different implementations, other techniques may be used to handle secure interrupts with the security monitor 108.

Therefore, any interrupt asserted by a functional block 202 assigned to the secure world is handled securely, without interception from a malicious application, or the like.

In a further implementation, the security monitor 108 is arranged to disable debugging infrastructure of the controller 100 when the secure-mode signal is asserted, and enable the debugging infrastructure when the secure-mode signal is de-asserted. In this way, secure operations and transactions are kept isolated from debugging infrastructure as well, providing an additional level of security. In various implementations, alternate or additional protection mechanisms may be used to prevent unauthorized debugging when in secure-mode.

If included, the memory controller 110 may be arranged to control access to the memory storage devices, such as the secure memory 112 and the general purpose memory 114, by applications and/or routines based on the secure-mode signal output by the security monitor 108. For example, access to the secure memory 112 may be granted to a secure application when the security monitor 108 asserts the secure-mode signal. Conversely, access to the secure memory 112 may be denied when the security monitor 108 de-asserts the secure-mode signal.

In various implementations, memory storage devices 112 and 114 may be implemented using any form of computer-readable media that is accessible by the processor (i.e., CPU 106). Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 112, 114 is an example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may accessed by the processor 106.

In contrast, communication media typically embodies computer readable instructions, data structures, program modules, or other data in a modulated data signal, such as a carrier wave, or other transport mechanism.

If included, the bridge 116 provides a signal path between buses, interconnects (such as L1, L2), and the like. In various implementations, the bridge 116 may include one or more ports to accommodate the interconnects, etc.

In another implementation, the topology 100 may include a bus master 118. In the implementation, the bus master 118 is arranged to direct traffic on the buses, interconnects, and so forth. For example, the bus master 118 may direct data or packets to and from the input/output components (such as one or more modules 102), or the like. In various implementations, the bus master 118 controls (either dynamically or initially) the signal paths for data, addresses, and so forth, generally with respect to input/output devices and/or modules 102. In another implementation, the bus master 118 may be a second or subsequent bus master, based on other (e.g., priority, additional, etc.) bus traffic control located elsewhere, such as the CPU 106, or so forth.

In alternate implementations, a controller topology 100 may include fewer components, additional components, or alternate components to perform the functions discussed, or for other desired functionality.

Example Resource Module

Figure 2:
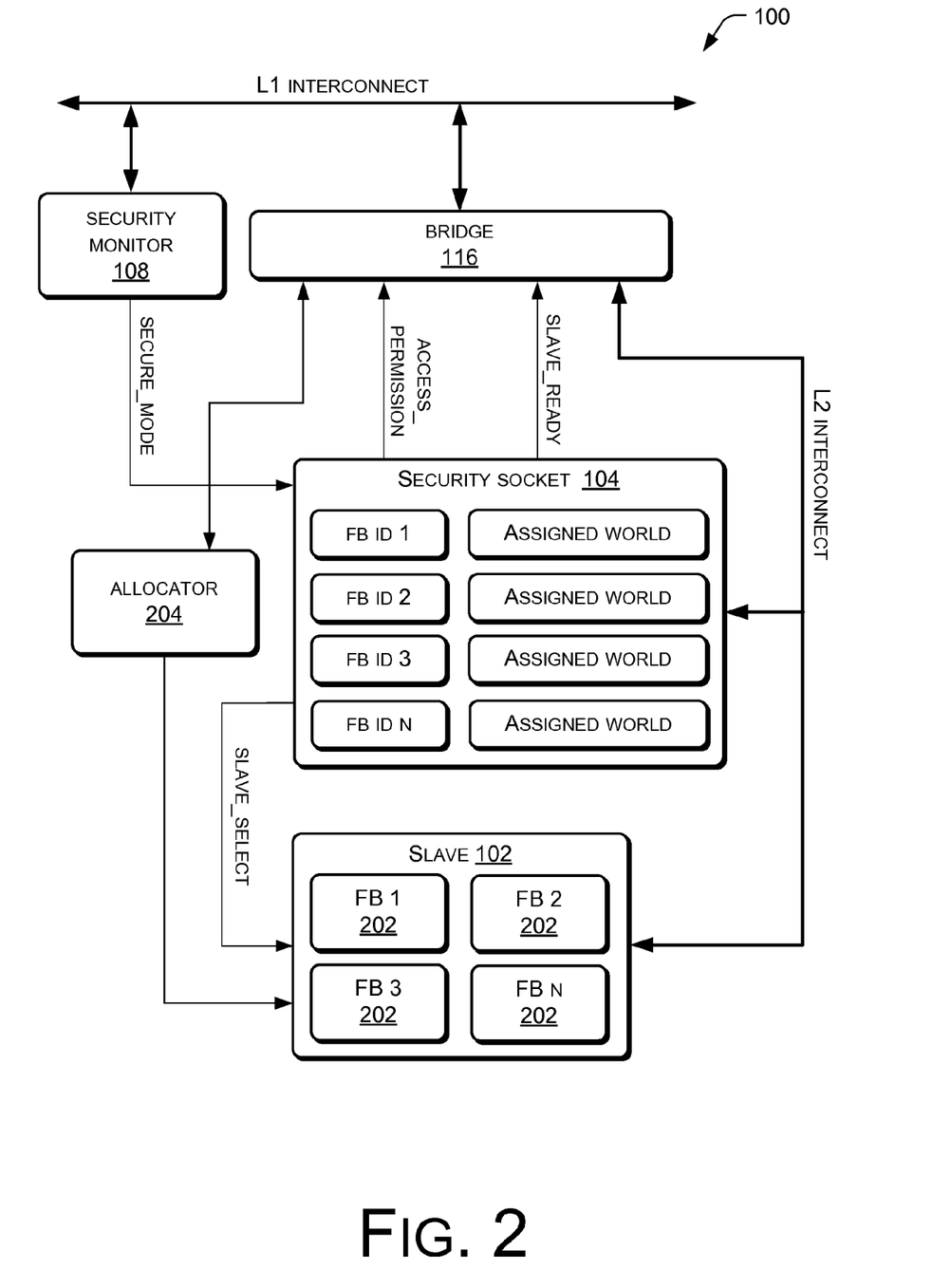
FIG. 2 is a block diagram of an example module, comprised of a quantity of functional blocks, according to an implementation. The module is shown with its associated security socket wrapper, and various interconnect paths.

FIG. 2 is a block diagram of a portion of the controller topology 100, showing detail of an example module 102, and associated components. In an implementation, the modules 102 are comprised of a quantity of functional blocks 202. In the illustration of FIG. 2, the module 102 is shown with its associated security socket (a.k.a. wrapper) 104 and associated allocator 204. It should be understood that the allocator 204 may be associated with the module 102 as shown, or may be associated with another module, or may be a separate element.

In an implementation, as shown in FIG. 2, the shared resource modules 102 are partitioned into a quantity of functional blocks 202, which may be assigned to be secure functional blocks or non-secure functional blocks. In one implementation, the functional blocks 202 are allocated as either secure or non-secure functional blocks 202 based on the order that they are requested by an application or routine, and according to the secure nature or authorization of the requesting application.

This is represented by the assignment of a functional block 202 to a particular "world," for example. For a duration, each functional block 202 may be assigned to a general purpose world 402 (i.e., "non-secure world," "normal world," etc.) or to a "secure world" 404 (as shown in FIG. 4B). Assignment to a secure world 404 means that the functional block 202 is accessible to authorized applications, routines, etc. while the security monitor 108 asserts (i.e., outputs) the secure-mode signal. In other words, the functional block 202 becomes a dedicated resource accessible (for a duration) in a privileged operating mode—the secure mode of operation. The functional block 202 is not accessible to any applications, routines, etc. while the security monitor 108 de-asserts (i.e., ceases) the secure-mode signal. For example, attempts to access the functional block 202 while the secure mode is inactive returns a busy signal, or the like.

Assignment to the general purpose (GP) world 402 means that the functional block 202 is accessible to any applications, routines, etc., regardless of whether the security monitor 108 asserts the secure-mode signal or not. Applications accessing a functional block 202 assigned to the GP world cannot expect that their operations are secure or isolated from other operations, routines, and so forth.

Additionally, a functional block 202 may be assigned to neither the GP world 402 nor the secure world 404 for a duration. This means that the functional block 202 is free for the duration, and is available to be assigned in the future to a requesting application (either non-secure or secure application).

For example, in an implementation, the controller topology 100 may include an allocator 204 arranged to dynamically allocate one or more of the plurality of functional blocks 202 of one or more resource modules 102 to a requesting non-secure application and/or dynamically allocate one or more other of the plurality of functional blocks 202 of the one or more resource modules 102 to a requesting secure application. In various implementations, this may include a succession of consecutive requests from one or more non-secure applications and/or a succession of consecutive requests from one or more secure applications. Following these requests, the allocator 204 is arranged to allocate functional blocks 202 from the requested module 102 to the requesting applications, in the order of the requests.

In one implementation, however, requests for a module 102 are received from a non-secure application and a secure application back-to-back. For instance, in the implementation, the allocator 204 may receive a first request for a resource of a module 102 from a first application, where the first application is a secure application or a non-secure application. The allocator 204 allocates a first functional block 202 of the plurality of functional blocks 202 of the module 102 to the first application. Subsequently, the allocator 204 receives a second request for a resource of the same module 102 from a second application, where the second application is the opposite of the first application, e.g., a non-secure application or a secure application, respectively. Accordingly, the allocator 204 allocates a second functional block 202 of the same module 102 to the second application. In the implementation, the second application accesses the module 102 concurrent to the first application accessing the module 102, however, the first functional block 202 is communicatively isolated from the second functional block 202 such that there is no leakage of data or compromising of the security of the secure application or its allocated functional block(s) 202.

Thus, in various implementations, one or more secure functional blocks 202 of a module 102 can be accessed by secure applications concurrent to one or more non-secure functional blocks 202 of the module 102 being accessed by non-secure applications. This may be accomplished without duplication of hardware since the secure functional blocks 202 are communicatively isolated from the non-secure functional blocks 202.

Further, additional functional blocks 202 (while available) of the same module 102 may be allocated to the first or second applications, or to additional applications, whether secure on non-secure, on a first-request-received basis. In alternate implementations, allocation of functional blocks 202 of a module 102 may occur based on a predefined priority system, or other established rules (e.g., considering rules of the operating system, and so forth).

In various implementations, the allocator 204 may comprise a module, a component, a routine, or the like, or combinations of the same. Portions of the allocator 204 may be implemented in hardware, firmware, and/or software. Additionally, in some implementations, an allocator 204 may be local to a specific module 102 (e.g., the allocator may be located or stored at least partly within the module 102), and be singly associated to the specific module 102, allocating functional blocks of that module 102. In an alternate implementation, an allocator 204 may be more generally associated (e.g., associated with a group of modules 102, associated to an interconnect (L1, L2), etc.), and be arranged to allocate functional blocks 202 of multiple modules 102. In such alternate implementations, portions of the allocator 204 may be located or stored remote to one or more of the multiple modules 102 associated to the allocator 204.

The illustration of FIG. 2 shows the slave (module) 102 partitioned into "n" functional blocks 202. In various implementations, the functional blocks 202 may be identical, or very nearly identical, within the capabilities of the module 102. In other implementations, the functional blocks 202 may be partitioned based on the resource needs of the requesting applications, or on other conditions.

In an implementation, as shown in FIG. 2, a security socket (a.k.a. wrapper) 104 is associated to a specific module 102. In an alternate implementation, the security socket 104 is associated to more than one module 102. In various implementations, the security socket 104 is programmed with configuration information of the functional blocks 202 that it services (e.g. start address, size, secure access permissions, etc.). In one implementation, the security socket 104 is arranged to determine access permissions of each of the allocated functional blocks 202 of the one or more resource modules 102 it is associated to. For example, the access permissions are based on whether a functional block 202 is allocated to a non-secure application or allocated to a secure application.

This is represented in the illustration of FIG. 2, by the list of functional blocks 202 (FB ID 1 through FB ID N) and the associated assigned world for each of the functional blocks 202 ("assigned world") within the security socket 104 diagram. As mentioned, the assigned world for each functional block 202 may include the general purpose (GP) world 402, the secure world 404, or neither (e.g., available for assignment to a world).

In an implementation, secure executable instructions are allowed to program the security socket 104 with configuration information. As used herein, secure executable instructions includes instructions of secure (e.g., authorized, trusted, etc.) software or code. However, non-secure executable instructions, that is, instructions of non-secure (e.g., non-authorized, not trusted, not verified, etc.) software or code, are not allowed to program the security socket 104. In one implementation, the secure and non-secure executable instructions include firmware, such as firmware associated with hardware components coupled to the controller 100, firmware stored in non-volatile memory storage devices of the controller 100, and the like.

In various alternate implementations, the secure and non-secure executable instructions include any computer or processor-executable instructions, wherever they are stored or whatever their origin (e.g., memory storage devices, embedded systems, peripheral devices, networks, the Internet, cloud storage, portable/removable storage devices or media, and the like). For example, only secure executable instructions, regardless of its origin, is allowed to program the security socket 104. Since the security socket 104 determines permissions, this prevents a non-secure source from altering permissions associated with functional blocks 202 or modules 102.

In an implementation, the topology 100 may further include interconnect registers arranged to determine other access permissions of the one or more resource modules 102. For example, a module 102 may have particular permissions (e.g., the module 102 may have been hardwired for read-only access, etc.) based on the intended use, installation, resource type, and so forth, of the module 102. In such case, any application that attempts an operation counter to the module's permissions (e.g., a write operation to a read-only resource module 102) will be unsuccessful in performing the operation, based on the interconnect information regarding the module 102.

Example Implementations

Figure 3:
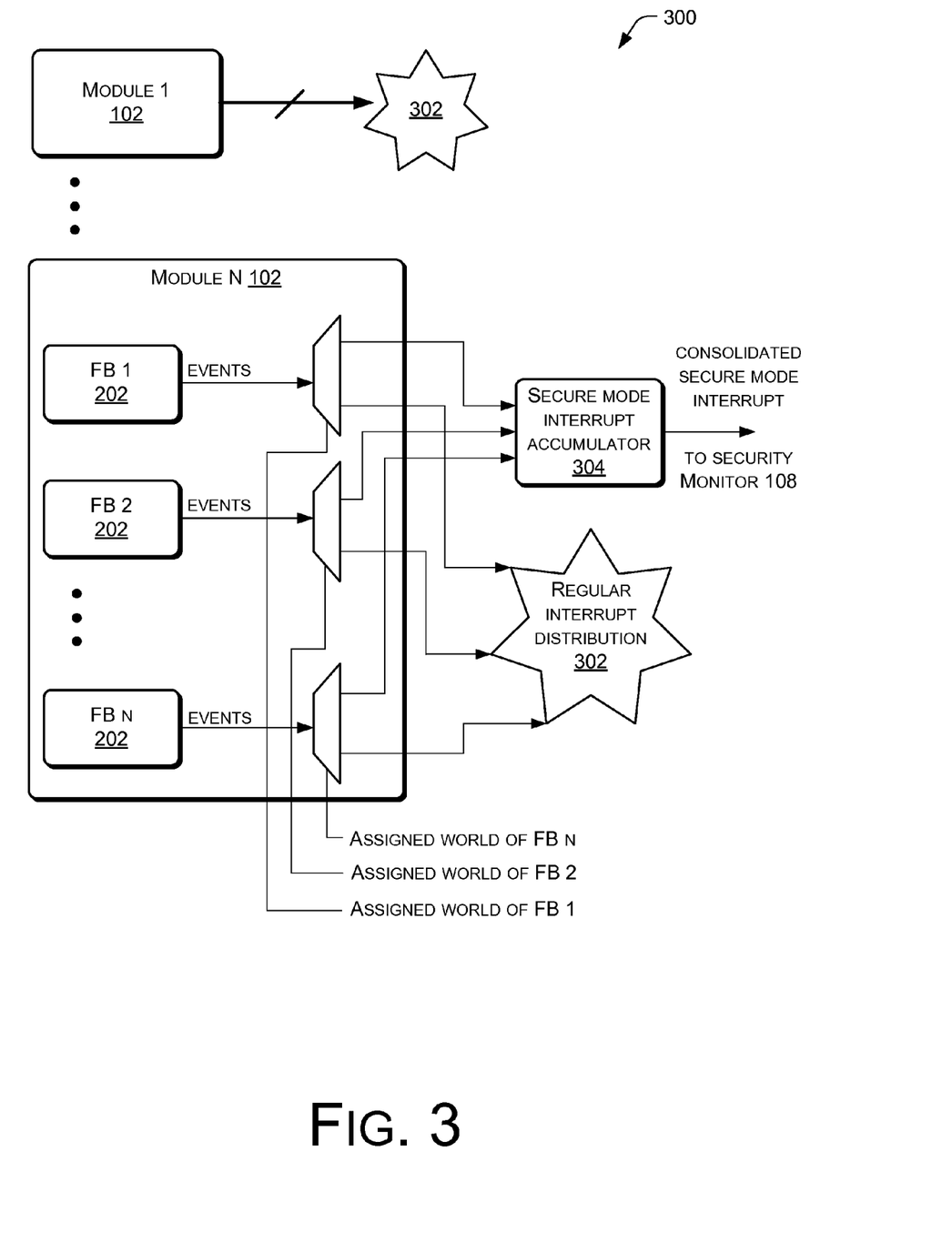
FIG. 3 is a block diagram of an example interrupt delivery mechanism, shown at a functional block level, according to an implementation.

As discussed above, a security monitor 108 may control the handling of secure interrupts, and the like. FIG. 3 is a block diagram of an example interrupt delivery mechanism 300, shown at a functional block level, according to an implementation.

In the implementation, as shown in FIG. 3, a module 102, such as module N is partitioned into a quantity of "n" functional blocks 202. Each of the functional blocks 202 may generate interrupts based on events happening at the functional block 202. In an implementation, the interrupts are segregated into general interrupts and secure interrupts. For example, functional blocks 202 used by general routines may generate general interrupts and functional blocks 202 used by secure routines may generate secure interrupts.

In the implementation, as shown in FIG. 3, general interrupts are channeled to a regular interrupt distribution 302, as in any general controller scheme, or according to the general interrupt handling of the particular processor (e.g., CPU 106). For example, the interrupts may be channeled to the CPU 106 for processing.

In the implementation, as shown in FIG. 3, the secure interrupts are aggregated to a secure mode interrupt accumulator 304, or the like. The aggregated interrupts are handled separately from the general interrupts to preserve security of the secure applications, routines, resources, and the like. For example, the accumulated secure interrupts may be forwarded to the security monitor 106 as shown in FIG. 3. As discussed above, the security monitor 108 may forward the aggregated secure interrupt requests to the CPU 106 and/or an interrupt controller for processing of the interrupts.

As shown, in an implementation, each functional block 202 of a module 102 may include general interrupt paths and secure interrupt paths to accommodate being allocated as a non-secure functional block 202 or a secure functional block 202. Accordingly, each functional block 202 may be allocated differently (non-secure or secure) in different scenarios, depending on the application(s) executing on the CPU 106.

FIG. 4A is a block diagram of an example interrupt handling scheme that includes handling the GP world 402 interrupts with a dedicated GP interrupt controller (GP intC) 406 and handling secure world 404 interrupts with a dedicated secure interrupt controller (SEC intC) 408. In this scheme, and like schemes, duplication of resources is generally used to ensure that the secure interrupts are handled in isolation.

In contrast, FIG. 4B shows an example scheme as outlined above with respect to FIG. 3. For example, secure world 404 interrupts may be handled via the security monitor 108, including aggregating the secure interrupts and then forwarding the aggregated interrupt signal to the CPU 106, or the like, for processing. This aggregated interrupt signal may be further aggregated to the general purpose interrupts (from GP applications, for example) as it is received by the CPU 106. In this way, the CPU 106, as well as the controller 100 and its general purpose components, is unaware of the source of the interrupt received. Accordingly, the secure nature of the secure interrupts and their secure application(s) is preserved.

Figure 5A:
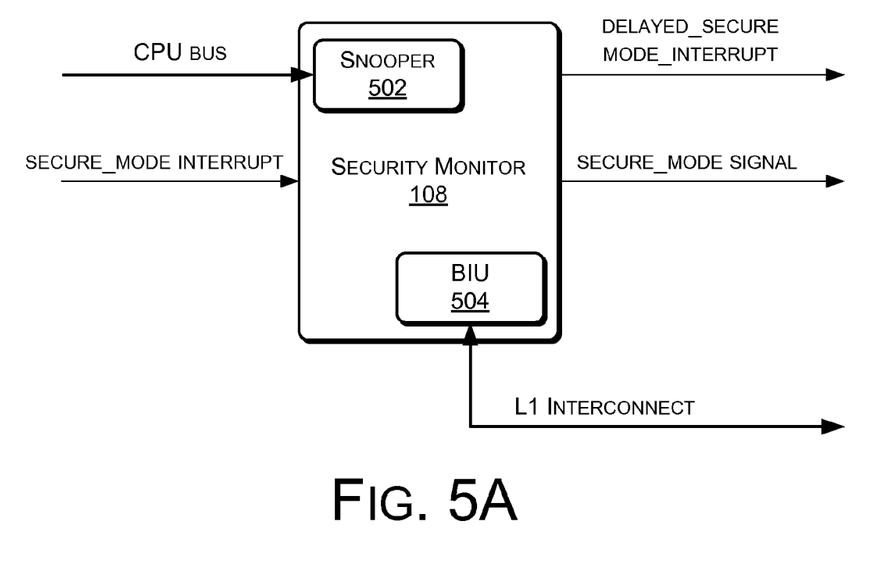
FIG. 5A is a block diagram of an example security monitor, according to an implementation.

FIG. 5A is a block diagram of an example security monitor 108, according to an implementation. As shown in FIG. 5A, an example security monitor 108 may include a snooper component 502 arranged to monitor the CPU 106 for secure mode entry and exit sequences (as shown in FIGS. 5B and 6-9) by applications executing on the CPU 106. In additional or alternate implementations, the security monitor 108 may be arranged to interface with the CPU 106 via a CPU Bus and/or interface with the controller 100 via an interconnect (such as L1, L2) using a bus interface unit (BIU) 504, or the like.

As discussed above, in other implementations, the security monitor 108 may be arranged to receive one or more secure interrupts and output an aggregated secure-mode interrupt.

Figure 5B:
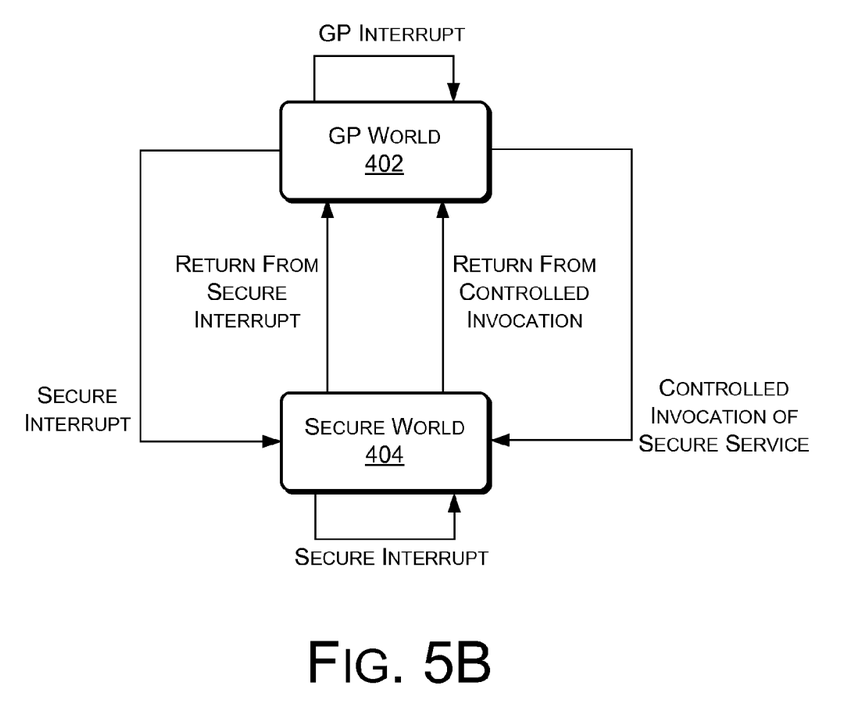
FIG. 5B is a state diagram showing example switching between non-secure and secure worlds, according to an implementation.

FIG. 5B is a state diagram showing example switching between a non-secure GP world 402 and a secure world 404, according to an implementation. Various triggers and results are shown; where the switch from one of the "worlds" to the other of the "worlds" is facilitated by the security monitor 108 asserting or de-asserting the secure-mode signal, as discussed.

The illustration of FIG. 5B shows that a secure interrupt from an application or routine in the secure world 404 initiates a switch to secure-mode to handle the secure interrupt. For example, an application in the secure world 404 can raise an interrupt while the GP world 402 is active, necessitating a switch to the secure world 404 for secure handling of the secure interrupt. This will cause the security monitor 108 to assert the secure-mode signal. The secure interrupt is handled while in the secure world (e.g., secure resources, modules 102, memory 112, and the like are accessible to authorized applications and/or routines). Completion of the secure interrupt handling initiates a switch back to the GP world 402 (including a return from the secure interrupt).

As shown in FIG. 5B, a GP interrupt is handled within the GP world 402 and a secure interrupt is handled within the secure world 404 as discussed above.

The illustration of FIG. 5B also shows that a controlled invocation of a secure service from an application or routine in the GP world 402 initiates a switch to the secure world 404 to process the request. For example, this would also cause the security monitor 108 to assert the secure-mode signal. A controlled invocation of a secure service may include a request for resources from a module 102, and the like. The request is handled within the secure world 404, including providing the service(s) requested, such as module 102 resources from one or more functional blocks 202, as discussed above. Completion of the secure service initiates a switch back to the GP world 402 (including a return from the controlled invocation).

Figure 6:
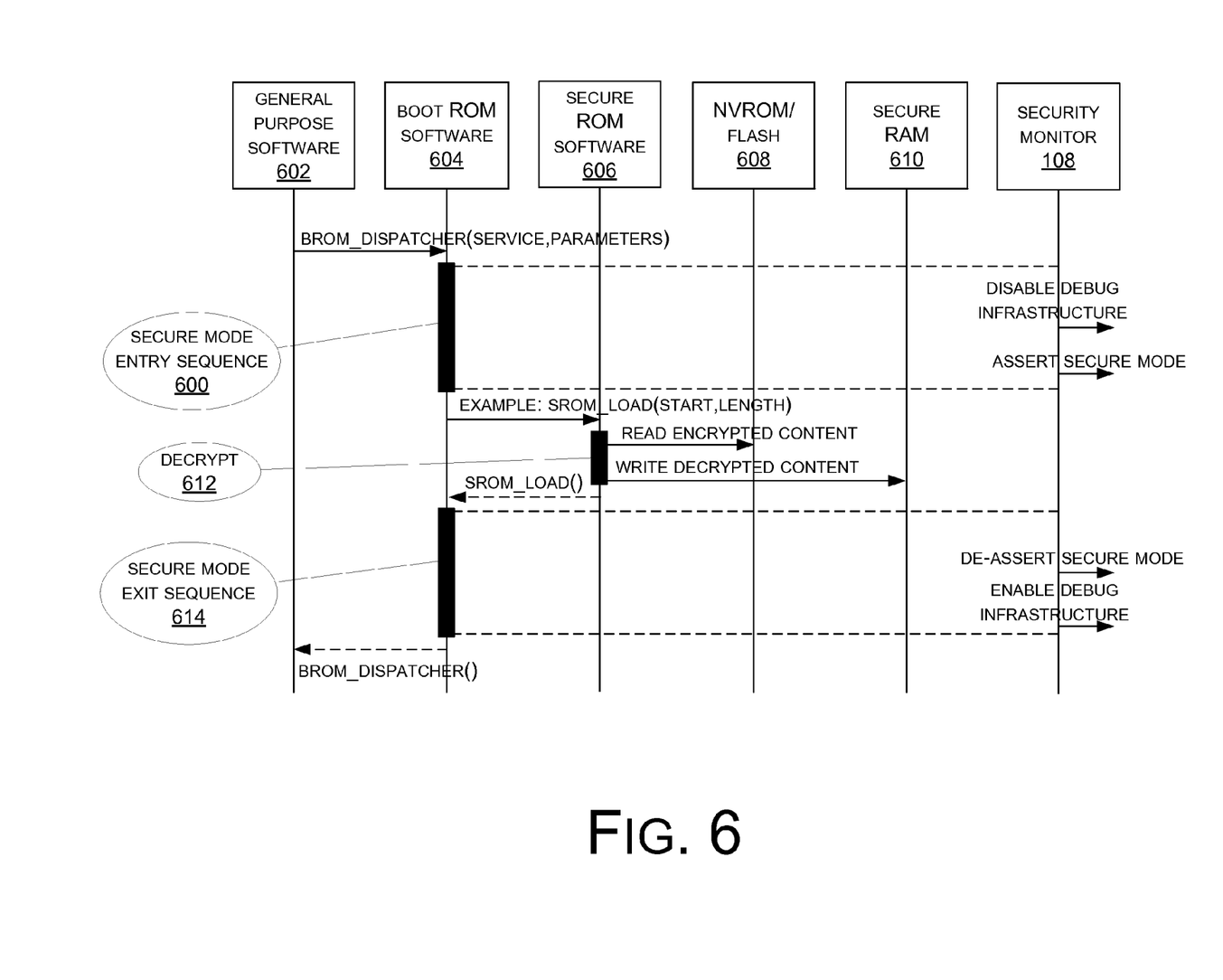
FIG. 6 is a progression diagram showing example stages of switching between non-secure and secure worlds, according to an implementation.

FIG. 6 is a progression diagram showing example stages of switching between non-secure 402 and secure 404 worlds, according to an implementation. For example, a secure mode entry sequence 600 may be initiated when a GP world application 602 requests secure services via a BootROM interface 604. In an implementation, the BootROM dispatcher (BROM_DISPATCHER(SERVICE, PARAMETERS) is invoked with the necessary details of the service request. The invocation of the dispatcher and subsequent execution of the entry sequence 600 is monitored by the security monitor 108, which at the end of the entry sequence 600, asserts the secure-mode signal.

Prior to asserting the secure-mode signal, the security monitor 108 may disable the debugging infrastructure temporarily, as mentioned above. With the assertion of the secure-mode signal, the secure world 404 is active, and secure resources (such as secure functional blocks 202 of a module 102, for example) are accessible to authorized applications, routines, and the like. BootROM can pass the service request to secure ROM 606 (for example, with the function shown as SROM_LOAD(START, LENGTH)), which either executes the desired request or passes the request to a secure application in secure RAM 610.

In the example shown in FIG. 6, the service includes a decrypt service 612 at the secure ROM 606, including reading encrypted content (at NVROM/FLASH 608, for example), decrypting the content and writing the decrypted content to the secure RAM for I/O processing, for example. After the service is complete, the SROM_LOAD( ) function returns to the Boot ROM 604, and the secure mode exit sequence 614 is initiated. This includes de-asserting the secure-mode signal and enabling the debugging infrastructure by the security monitor 108. Finally, the BootROM dispatcher returns control to the GP software 602 that called the routine.

In the example implementation, the GP software, Boot ROM software 604, and NVROM/FLASH 608, may be loaded into GP memory 114 and the secure ROM software 606 and secure RAM 610 may be loaded into the secure memory 112, for example.

Figure 7:
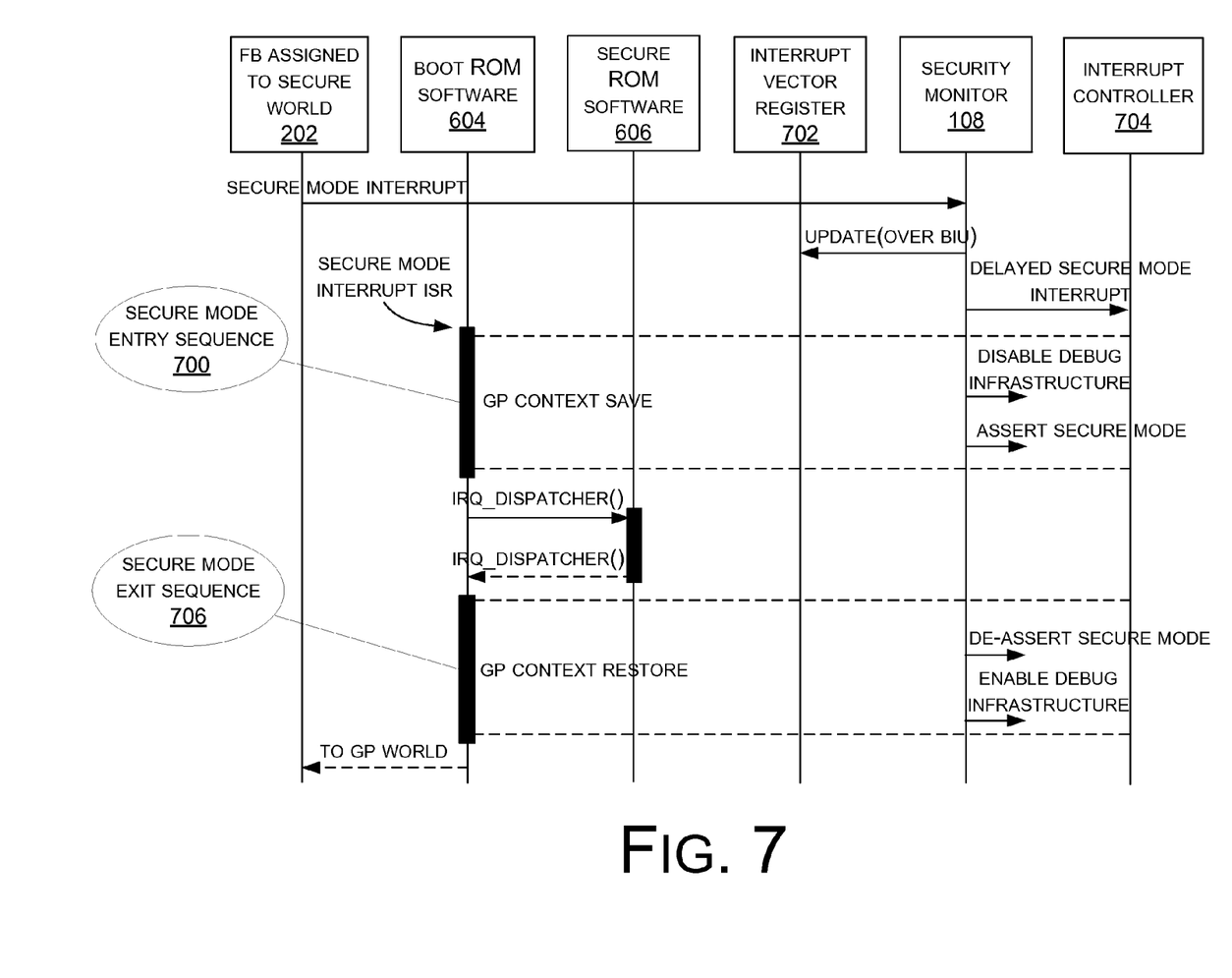
FIG. 7 is a progression diagram showing a technique for controlled transitions between non-secure and secure worlds, specifically detailing the interrupts involved, according to an implementation.

FIG. 7 is a progression diagram showing a technique for controlled transitions between non-secure 402 and secure 404 worlds, specifically detailing the interrupts involved, according to an implementation. For example, a secure mode entry sequence 700 may be initiated when a secure mode interrupt is detected by the security monitor 108. In the example scenario of FIG. 7, a secure interrupt event is flagged by a secure world 404 assigned functional block 202. The secure interrupt event is received by the security monitor 108, which updates the secure interrupt vector entry in the application vector register 702, with the vector defined in Boot ROM 604, for example.

Once the safe vector entry has been installed, the original event is passed onto the regular interrupt controller 704, which then interrupts the CPU 106 and causes the newly installed handler to execute.

After the secure interrupt has been handled, the secure application in secure ROM 606 returns control to the Boot ROM 604, which then executes the secure mode exit sequence 706. This restores the context of the interrupted GP application (including the original vector table).

Figure 8:
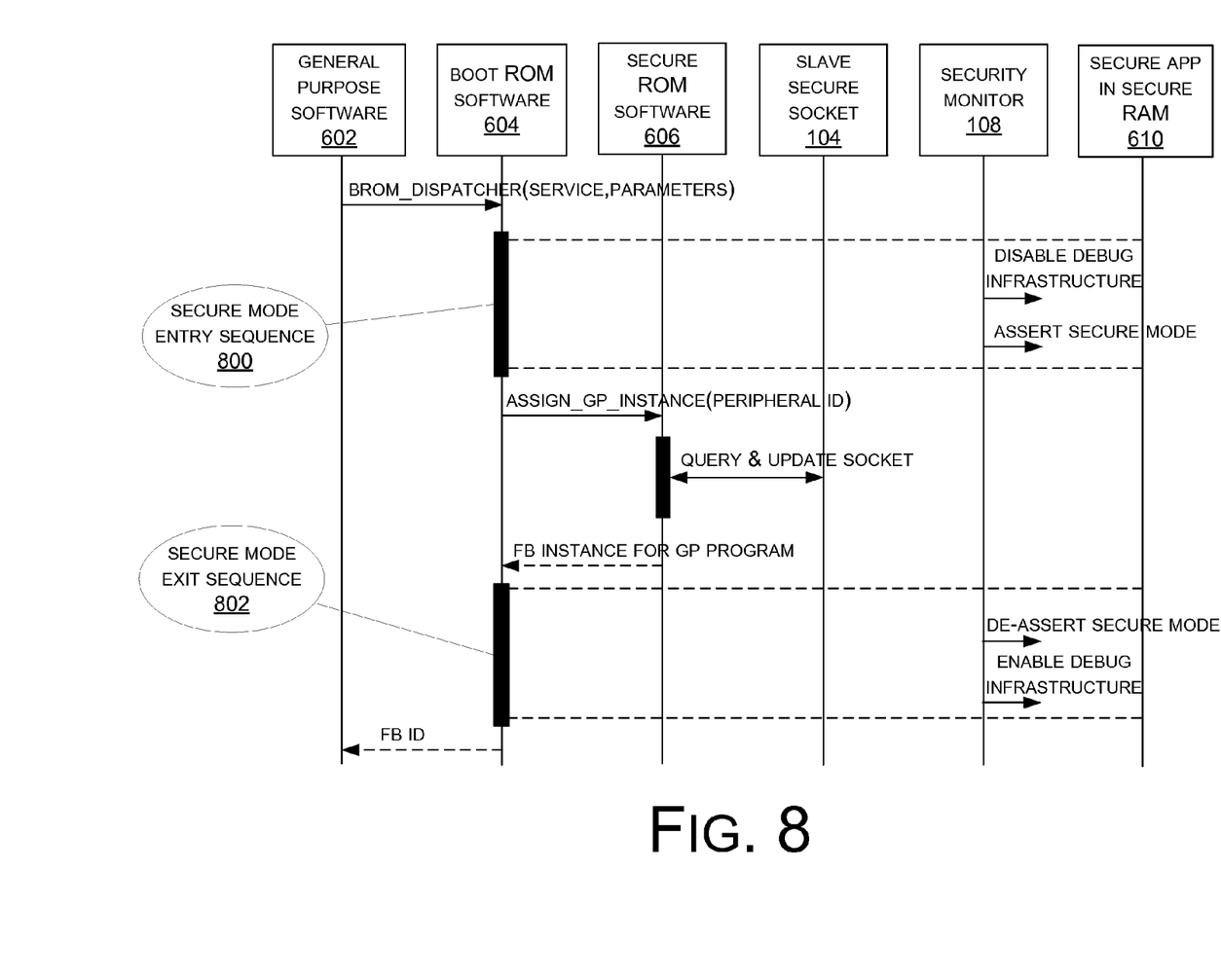
FIG. 8 is a progression diagram showing example stages of assigning functional blocks to non-secure applications, according to an implementation.

FIG. 8 is a progression diagram showing example stages of assigning functional blocks 202 to non-secure GP applications 602, according to an implementation. For example, a secure mode entry sequence 800 may be initiated when the GP application 602 makes a request for resources via the Boot ROM dispatcher using the Boot ROM software 604. A dedicated secure ROM 606 service is invoked.

In the example implementation, the secure ROM 606 service reads the secure socket 104 associated with the requested resource module 202, and identifies the first available functional block 202. The functional block 202 is allocated and assigned to the GP world 402. The secure mode exit sequence 802 is initiated, including returning the functional block's ID to the GP application 602.

Figure 9:
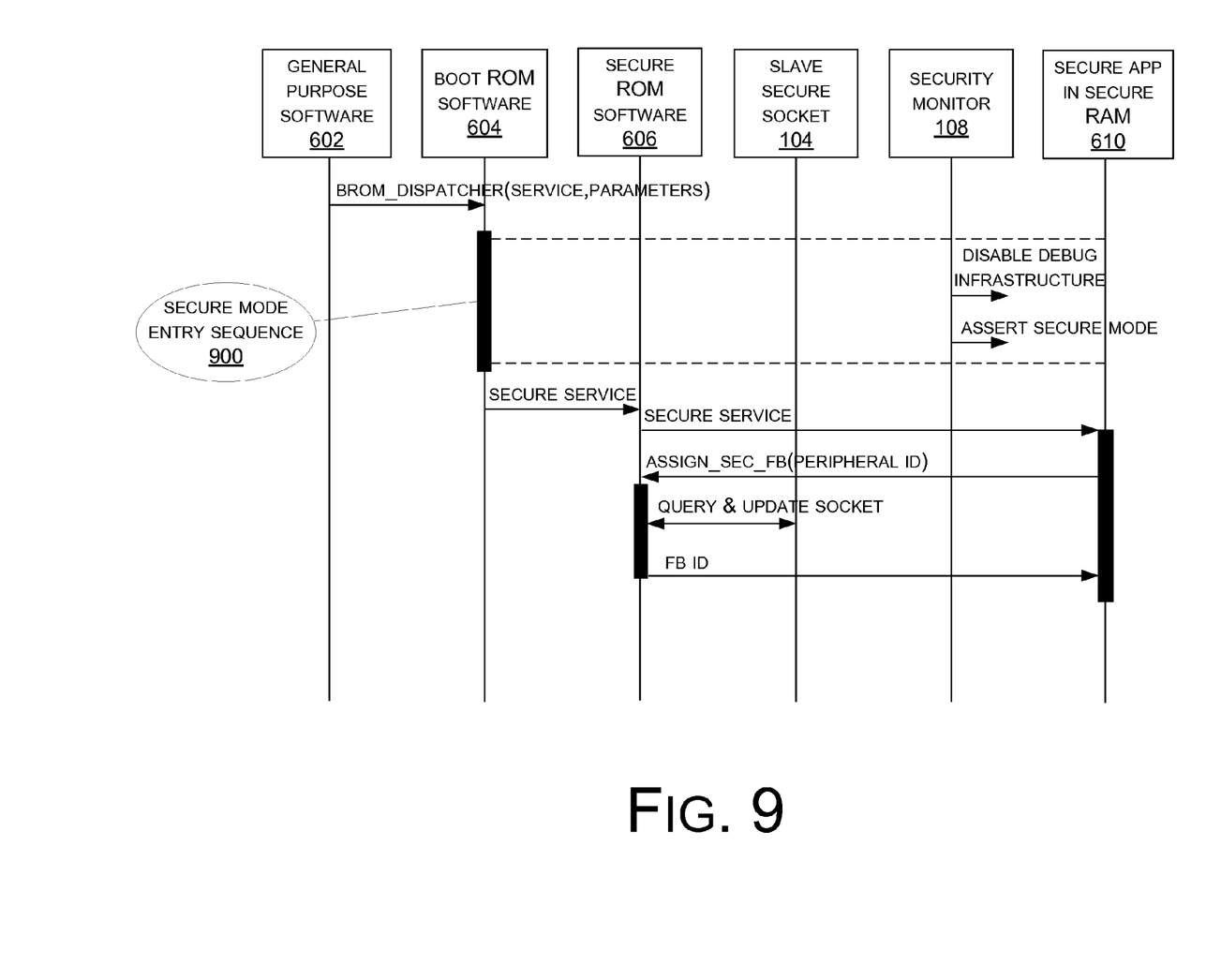
FIG. 9 is a progression diagram showing example stages of assigning functional blocks to secure applications, according to an implementation.

FIG. 9 is a progression diagram showing example stages of assigning a functional block 202 to a secure application 610, according to an implementation. For example, a secure mode entry sequence 900 may be initiated when a GP application 602 requests a secure service via the Boot ROM dispatcher using the Boot ROM software 604. A dedicated secure ROM 606 service is invoked which transfers control (SECURE SERVICE) to a secure application 610 capable of fulfilling the requested service. The secure application 610 may use a hardware resource, for example, to fulfill the secure service request of the GP application 602.

In the example implementation, the secure application 610 can directly request secure services via a pre-defined secure ROM 606 service (SECURE SERVICE) for an instance of a functional block 202, to fulfill the service request. Such a service temporarily assigns (AS-SIGN_SEC_FB( )) the allocated functional block 202 to the secure world 404, as discussed above. Following a query and an update of the security socket 104 associated to the module 102 of the allocated functional block 202, the secure ROM 606 returns the allocated functional block's ID to the secure application 610.

In various implementations, as shown in FIGS. 6-9, the services related to the assignment of functional blocks 202 may be different for GP 402 and secure 404 worlds. Accordingly, a common assignment service may find it difficult to ascertain where a service request came from.

As discussed above, the techniques, components, and devices described herein with respect to the implementations are not limited to the illustrations of FIGS. 1-9, and may be applied to other controller topologies, devices, and designs, without departing from the scope of the disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that a controller 100 may be implemented as a stand-alone device or as part of another system (e.g., integrated with other components, systems, etc.). In various implementations, additional or alternative components may be used to accomplish the disclosed techniques and arrangements.

Representative Process

Figure 10:
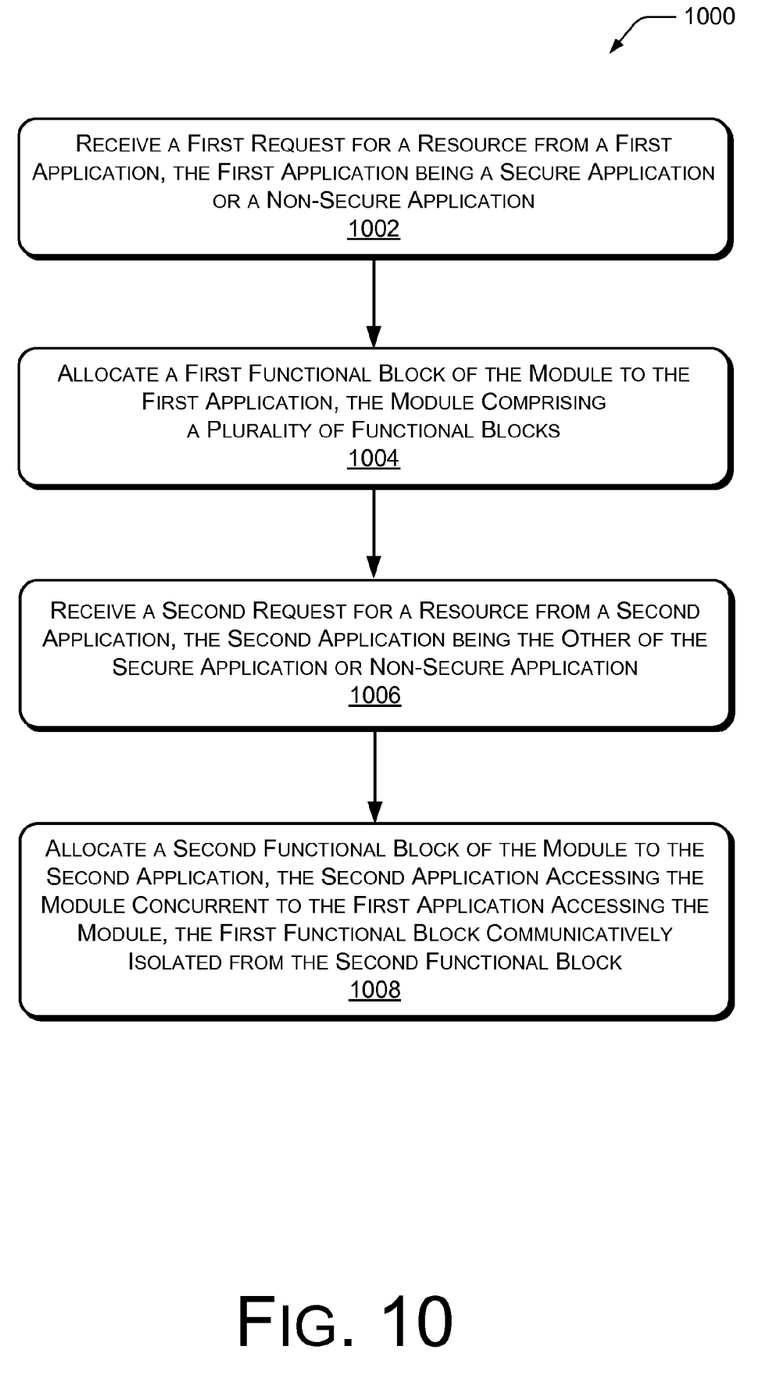
FIG. 10 is a flow diagram illustrating an example process for providing dynamic resource sharing between non-secure and secure applications, according to an implementation.

FIG. 10 is a flow diagram illustrating an example process 1000 for providing dynamic sharing of resources, according to an implementation. The process 1000 describes using a security monitor (such as security monitor 108, for example) to monitor applications executing on a controller (such as controller 100, for example). Functional blocks (such as functional blocks 202, for example) of resource modules (such as modules 102, for example) may be allocated to non-secure and secure applications concurrently, without compromising the security of the secure applications and their assigned resources, and without duplication of hardware. The process 1000 is described with reference to FIGS. 1-9.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 1002, the process 1000 includes receiving a first request for a resource of a module (such as module 102, for example) from a first application, according to an implementation. In the implementation, the first application comprises one of a secure application or a non-secure application.

At block 1004, the process includes allocating a first functional block (such as functional block 202, for example) of the module to the first application. In an implementation, the first functional block is the first available functional block of the module. For example, in the implementation, the module comprises a plurality of functional blocks. In one implementation, the process includes partitioning the module into the plurality of functional blocks such that the functional blocks of the module are similar or identical. In an alternate implementation, the functional blocks are partitioned based on other desired characteristics (e.g., priority, performance, etc.).

At block 1006, the process includes receiving a second request for a resource of the module from a second application. In an implementation, the second application comprises the other of the secure application or the non-secure application. For example, if the first application is a non-secure application, then the second application is a secure application, and vice versa. In an alternate implementation, the second application is the first application. In another implementation, the second application has the same security (non-secure or secure) as the first application.

At block 1008, the process includes allocating a second functional block of the module to the second application. In one example, the second functional block is the next available functional block of the module. In an implementation, the second application accesses the module concurrent to the first application accessing the module. In the implementation, the first functional block is communicatively isolated from the second functional block.

In one implementation, the process includes associating a wrapper to the module, where the wrapper is arranged to determine access permissions of allocated functional blocks of the module. For example, the access permissions are based on whether a functional block is allocated to a secure application or to a non-secure application. In another implementation, the process includes allowing or denying bus access to a functional block based on access permissions determined by the wrapper of the module.

In an implementation, the wrapper is programmable by secure executable instructions and not programmable by non-secure executable instructions. For example, firmware associated with a hardware device resource, or the like, may program the wrapper if the firmware is secure. In alternate implementations, secure executable instructions may include other forms of code, software, machine instructions, and the like.

In an implementation, the process includes assigning a functional block of the module to one of: a secure world, a non-secure world, or neither of the secure world nor the non-secure world, based on the access permissions determined by the wrapper of the module. In another implementation, the process includes allowing an application access to a functional block assigned to the secure world while a secure mode is active. In a further implementation, the process includes denying the application access to the functional block assigned to the secure world while the secure mode is inactive.

In an implementation, the process includes allowing or blocking a transaction with the module via interconnect fabric, based on predetermined permissions of the module. For example, the predetermined permissions (such as read-only access, or the like) may be hardwired or fixed conditions of the module.

In an implementation, the process includes allocating a next available functional block of the module to a next requesting application without regard to whether the next requesting application is a secure application or a non-secure application. In another implementation the next functional block is communicatively isolated from at least one of the first functional block and the second functional block, providing security between the functional blocks.

In alternate implementations, other techniques may be included in the process 1000 in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
   a snooper component arranged to monitor a processor and to determine whether an application executing on the processor requests secure access to a resource; and
   an output component arranged to output a secure-mode signal granting secure access to secure functional blocks of shared resource modules when the application is a secure application,
   wherein the shared resource modules are partitioned into secure functional blocks and non-secure functional blocks, the secure functional blocks being accessed by secure applications concurrent to the non-secure functional blocks being accessed by non-secure applications, and
   wherein the secure functional blocks are communicatively isolated from the non-secure functional blocks.

2. The apparatus of claim 1, further comprising an interrupt handling component arranged to reprogram an interrupt vector register with a secure interrupt service routine (ISR) handler when the secure-mode signal is asserted.

3. The apparatus of claim 1, wherein the apparatus asserts the secure-mode signal when an authorized application begins a secure transaction or initiates access to a secure resource and the apparatus de-asserts the secure-mode signal when an application ends a secure transaction or terminates access to a secure resource.

4. The apparatus of claim 1, wherein the apparatus is arranged to aggregate secure interrupt requests and to forward the aggregated secure interrupt requests to the processor and/or an external interrupt controller.

5. The apparatus of claim 1, wherein the apparatus is arranged to disable debugging infrastructure when the secure-mode signal is asserted, and enable the debugging infrastructure when the secure-mode signal is de-asserted.

6. A system, comprising:
   a processor arranged to concurrently execute a non-secure application and a secure application;
   a security monitor arranged to monitor the processor and to output a secure-mode signal when the secure application requests access to a resource module;
   one or more resource modules, each resource module including a plurality of functional blocks, one or more of the plurality of functional blocks allocated to the non-secure application and one or more other of the plurality of functional blocks concurrently allocated to the secure application; and
   one or more security sockets arranged to determine access permissions of each of the allocated functional blocks of the one or more resource modules, the access permissions based on whether a functional block is allocated to the non-secure application or allocated to the secure application.

7. The system of claim 6, further comprising an allocation module arranged to dynamically allocate one or more of the plurality of functional blocks of the one or more resource modules to a requesting non-secure application and/or dynamically allocate one or more other of the plurality of functional blocks of the one or more resource modules to a requesting secure application.

8. The system of claim 6, further comprising one or more memory storage devices, including a secure memory portion and a non-secure memory portion.

9. The system of claim 8, wherein access to the secure memory is granted to the secure application when the security monitor asserts the secure-mode signal, and wherein access to the secure memory is denied when the security monitor de-asserts the secure-mode signal.

10. The system of claim 6, further comprising interconnect registers arranged to determine other access permissions of the one or more resource modules.

11. The system of claim 6, wherein the one or more resource modules comprise one of a real-time clock, an interrupt controller, a keypad controller, and a direct memory access (DMA) module.

12. The system of claim 6, wherein secure executable instructions are allowed to program the security socket with configuration information and non-secure executable instructions are not allowed to program the security socket.

13. A method, comprising:
- receiving a first request for a resource of a module from a first application, the first application being one of a secure application or a non-secure application;
- allocating a first functional block of the module to the first application, the module comprising a plurality of functional blocks;
- receiving a second request for a resource of the module from a second application, the second application being the other of the secure application or the non-secure application; and
- allocating a second functional block of the module to the second application, the second application accessing the module concurrent to the first application accessing the module, the first functional block communicatively isolated from the second functional block.

14. The method of claim 13, further comprising partitioning the module into the plurality of functional blocks such that the functional blocks of the module are similar or identical.

15. The method of claim 13, further comprising associating a wrapper to the module, the wrapper arranged to determine access permissions of allocated functional blocks of the module, the access permissions based on whether a functional block is allocated to a secure application or to a non-secure application.

16. The method of claim 15, further comprising allowing or denying bus access to a functional block based on access permissions determined by the wrapper of the module.

17. The method of claim 15, wherein the wrapper is programmable by secure executable instructions and not programmable by non-secure executable instructions.

18. The method of claim 15, further comprising assigning a functional block of the module to one of: a secure world, a non-secure world, or neither of the secure world nor the non-secure world, based on the access permissions determined by the wrapper of the module.

19. The method of claim 18, further comprising allowing an application access to a functional block assigned to the secure world while a secure mode is active and denying the application access to the functional block assigned to the secure world while the secure mode is inactive.

20. The method of claim 15, further comprising allowing or blocking a transaction with the module via interconnect fabric, based on predetermined permissions of the module.

21. The method of claim 13, further comprising allocating a next available functional block of the module to a next requesting application without regard to whether the next requesting application is a secure application or a non-secure application.

22. The method of claim 21, wherein the next functional block is communicatively isolated from at least one of the first functional block and the second functional block.

23. A controller device comprising a processor and one or more memory storage devices having processor-executable instructions stored thereon that, when executed by the processor, direct the processor to perform operations including:
- receiving a first request for a resource of a module from a first application, the first application being one of a secure application or a non-secure application;
- allocating a first functional block of the module to the first application, the module comprising a plurality of functional blocks;
- receiving a second request for a resource of the module from a second application, the second application being the other of the secure application or the non-secure application; and
- allocating a second functional block of the module to the second application, the second application accessing the module concurrent to the first application accessing the module, the first functional block communicatively isolated from the second functional block.

* * * * *